United States Patent
Bulvan et al.

(12)

(10) Patent No.: US 6,464,179 B1
(45) Date of Patent: Oct. 15, 2002

(54) SYSTEM AND METHOD FOR MOUNTING PENDANT LIGHT FIXTURES

(75) Inventors: Richard J. Bulvan, Worth; Aaron P. Fryzek, Hickory Hills; Jose L. Adame, Bolingbrook; Casey Chung, Bloomingdale, all of IL (US)

(73) Assignee: Focal Point, L.L.C., Chicago, IL (US)

( * ) Notice: Subject to any disclaimer, the term of this patent is extended or adjusted under 35 U.S.C. 154(b) by 0 days.

(21) Appl. No.: 09/837,410

(22) Filed: Apr. 18, 2001

(51) Int. Cl.[7] ............................................. E21F 17/02
(52) U.S. Cl. ................................... 248/58; 248/317
(58) Field of Search ..................... 248/317, 58, 343, 248/342, 906; 52/39, 28, 506.7

(56) References Cited

U.S. PATENT DOCUMENTS

| | | | | |
|---|---|---|---|---|
| 1,132,999 A | * | 3/1915 | Beers ........................... | 248/62 |
| 3,599,921 A | * | 8/1971 | Cumber ....................... | 248/317 |
| 3,612,461 A | * | 10/1971 | Brown ......................... | 248/317 |
| 4,230,900 A | * | 10/1980 | Speet ........................... | 174/48 |
| 4,234,146 A | * | 11/1980 | Shima et al. .................. | 248/63 |
| 4,269,380 A | * | 5/1981 | Shima et la. .............. | 248/74 R |
| 4,448,006 A | * | 5/1984 | Worley ......................... | 52/488 |
| 4,715,161 A | * | 12/1987 | Carraro et al. ................ | 52/417 |
| 4,723,749 A | * | 2/1988 | Carraro et al. .............. | 248/317 |
| 4,958,792 A | * | 9/1990 | Rinderer ................... | 248/74.2 |
| 5,516,068 A | * | 5/1996 | Rice ........................... | 248/300 |
| 6,050,534 A | * | 4/2000 | Andrews ..................... | 248/317 |

OTHER PUBLICATIONS

Peerless Lighting Fixture Installation Instructions (2 pages).

* cited by examiner

Primary Examiner—Ramon O. Ramirez
Assistant Examiner—Kofi Schulterbrandt
(74) Attorney, Agent, or Firm—Banner & Witcoff, Ltd.

(57) ABSTRACT

A tee bar clip for mounting a pendant light fixture to drop ceiling tee bars of various widths and heights. The tee bar clip is adapted for use in combination with a suspension bracket. The suspension bracket is adapted for mounting a pendant light fixture to a tee bar with the tee bar clip at both feed and non-feed locations, to a drop ceiling grid hanger bar without a tee bar clip at feed and non-feed locations, and to a horizontally oriented junction box without a tee bar clip at feed and non-feed locations.

8 Claims, 8 Drawing Sheets

SYSTEM AND METHOD FOR MOUNTING PENDANT LIGHT FIXTURES

FIELD OF THE INVENTION

The invention relates generally to mounting pendant light fixtures to various components of dropped ceiling suspension hardware. More particularly, the invention relates to the system and method for mounting pendant light fixtures to tee bar clips of varying heights and widths, to hanger bars, and directly to octagon junction boxes.

BACKGROUND OF THE INVENTION

Brackets for mounting pendant light fixtures to various components of drop ceiling suspension hardware are known. For instance, Peerless Lighting of Berkeley, Calif. makes a two-piece hook bracket for mounting pendant light fixtures to drop ceiling tee bars and hanger bars. FIG. 1 shows first hook bracket 100 and second hook bracket 102, which are adapted for use in suspending bolt 104 from tee bar 106. Second hook bracket 102 installs on to tee bar 106 by moving in the direction of the arrow 110 in FIG. 1. Gaps 108-1 and 108-2 may be used in an alternate configuration to mount first hook bracket 100 and second hook bracket 102 to a hanger bar (not shown in FIG. 1). Such prior art hook brackets, however, are not adapted for use with different sized tee bars, such as tee bars having different heights or different widths or both. Further, such prior art hook brackets are not adapted for use in mounting a pendant light fixture directly to a horizontally oriented junction box that is already mounted within a drop ceiling.

Prior art pendant light fixture brackets are typically specific to one or two types of mounting configurations. For instance, brackets adapted for mounting to a tee bar and/or to a hanger bar typically are not adapted for mounting directly to an octagon junction box. Similarly, brackets adapted for mounting directly to a junction box typically are not adapted for mounting to a tee bar and/or a hanger bar. This lack of interchangeability of different types of pendant light fixture mounting brackets increases the costs associated with manufacturing, stocking, and supplying the appropriate pendant light fixture mounting hardware for various types of mounting configurations.

There is, therefore, a need for a system of components adapted for use in mounting pendant light fixtures to a tee bar, a hanger bar, and directly to a horizontally oriented junction box that has already been installed within a drop ceiling.

SUMMARY OF THE INVENTION

According to a first aspect of the invention, a tee bar clip is provided for mounting a pendant light fixture to a tee bar of a drop-ceiling grid. The tee bar is adapted for use with tee bars of various widths and heights. Such a tee bar. clip, in accordance with the principles of this invention, overcomes a primary shortcoming of prior art pendant light fixture tee bar mounting brackets, which typically are adapted for use with only a single or a relatively limited number of different sizes of tee bars.

A tee bar clip according to the principles of this invention is also adapted for use in combination with a suspension bracket, which is adapted for use in mounting a pendant light fixture to a tee bar with the tee bar clip at both feed and non-feed locations, to a drop ceiling grip hanger bar without tee bar clip at feed and non-feed locations, and to a horizontally oriented junction box without the tee bar clip at feed and non-feed locations. By being adapted for use with each of these scenarios, a suspension bracket in accordance with the principles of this invention simplifies and reduces the cost of supplying all of the necessary mounting hardware for all of the previously mentioned mounting scenarios via one system of components including a tee bar clip and suspension bracket in accordance with the invention.

Additional features and advantages of the invention will be apparent upon reviewing the following detailed description.

DETAILED DESCRIPTION OF THE INVENTION

Various inventive aspects will be described in connection with the FIGS. 2–8 in which like parts are depicted with like reference numbers.

Figure 1:
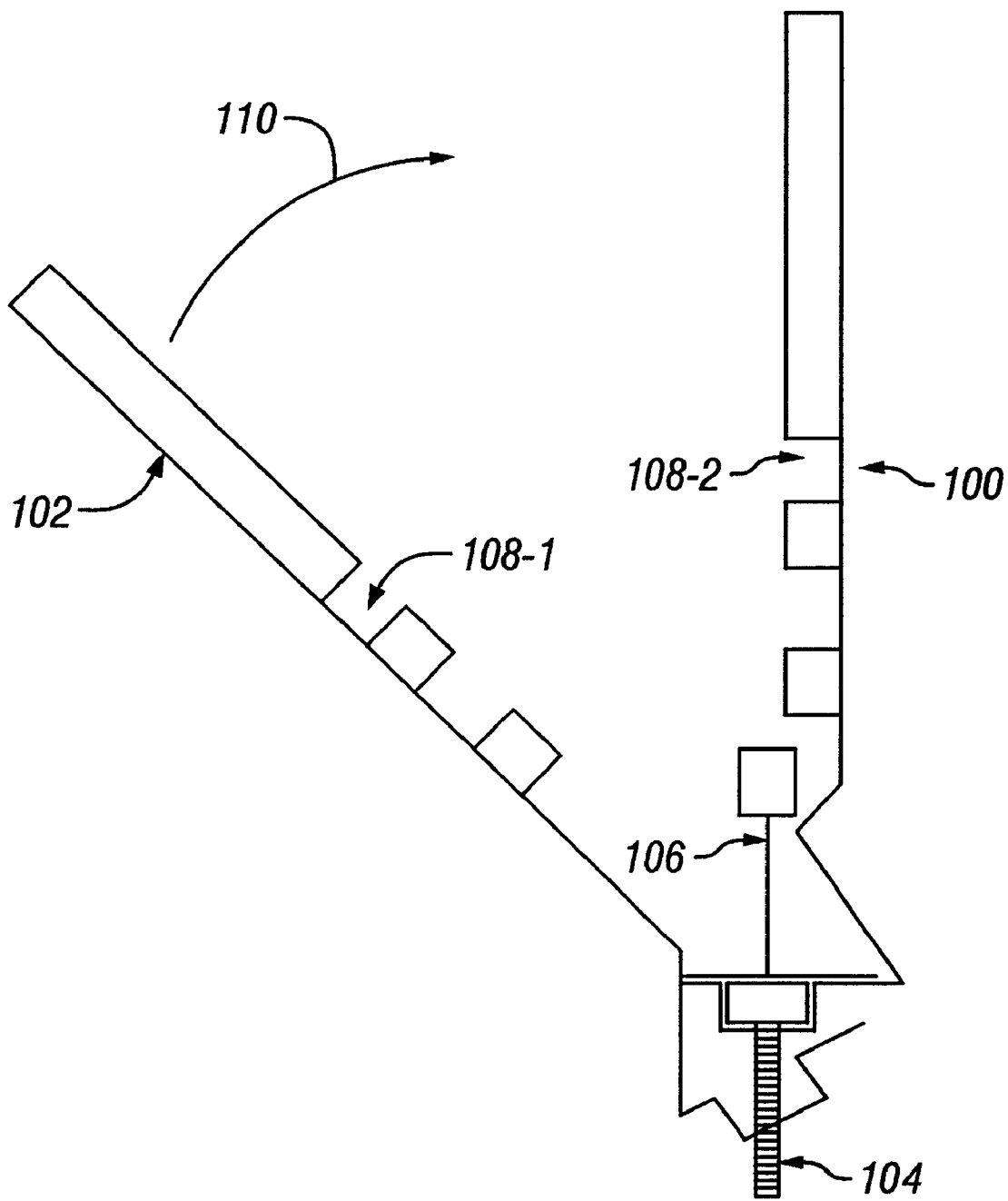
FIG. 1 depicts a prior art two-piece hook bracket for mounting a pendant light fixture to a tee bar or to a hanger bar.
Figure 2:
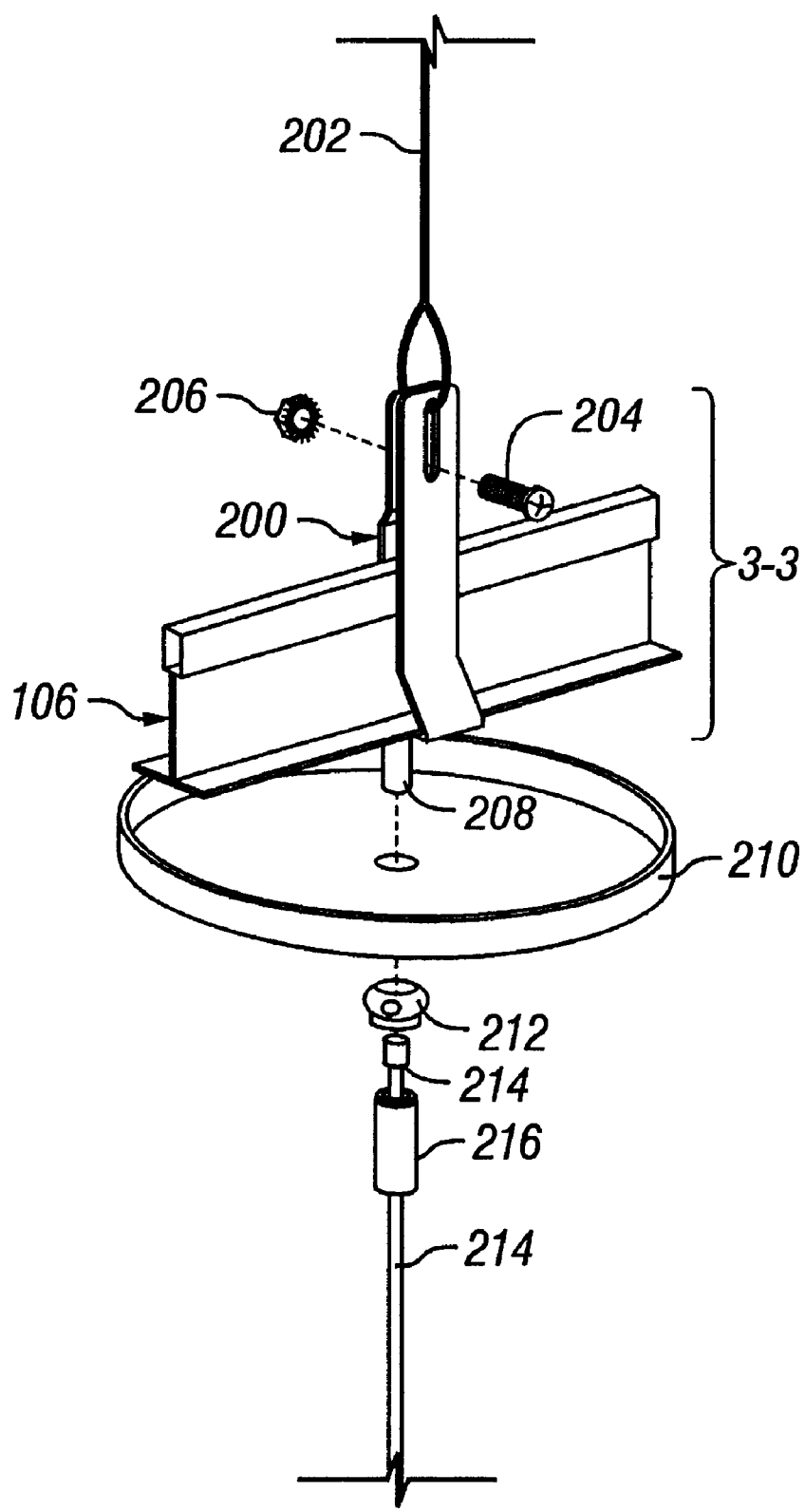
FIG. 2 depicts a tee bar clip in accordance with certain inventive principles.

FIG. 2 depicts tee bar clip 200 mounted to tee bar 106. Also shown in FIG. 2 are tie wire 202, screw 204, nut 206, bolt 208, canopy 210, slip ring 212, aircraft cable 214, and coupler 216. Bolt 208 may be externally threaded and coupler 216 may be internally threaded for coupling cable 214 to via coupler 216, bolt 208, and tee bar clip 200 to tee bar 106.

Figure 3:
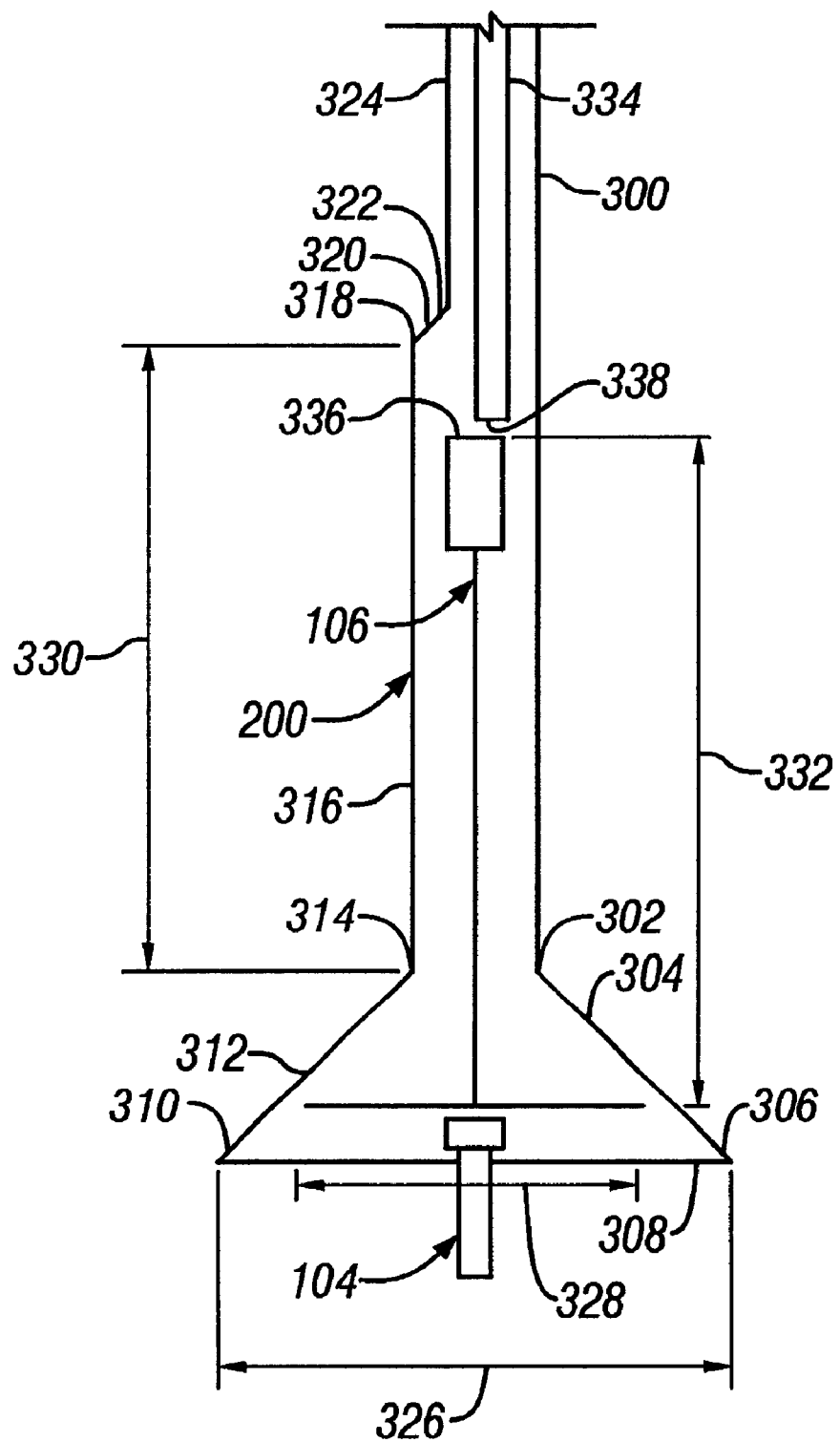
FIG. 3 is a partial sectional view of the tee bar clip shown in FIG. 2 taken along section viewing lines 3—3 of FIG. 2.

FIG. 3 depicts a sectional view of tee bar clip 200, tee bar 106, and bolt 104 taken along sectional view lines 3—3 in FIG. 2. Tee bar clip 200 includes first run 300, first bend 302, second run 304, second bend 306, third run 308, third bend 310, fourth run 312, fourth bend 314, fifth run 316, fifth bend 318, sixth run 320, sixth bend 322, and seventh run 324. Dimension 326 of third run 308 is such that tee bar clip 200 is adapted to the mounted to tee bars having different widths relative to each other. The width of tee bar 106 is depicted by double-headed arrow 328 in FIG. 3.

Height 330 of fifth run 316 is preferably such that tee bar clip 200 may be mounted to tee bar clips of various heights. The height of tee bar 106 is depicted by double-headed dimension arrow 332 in FIG. 3.

Lower portion 334 of a suspension bracket may optionally be inserted between first run 300 and seventh run 324 such that bottom surface 338 of bottom portion 334 of the suspension bracket engages top surface 336 of tee bar 106.

Suspension bracket 402 is shown in FIGS. 4–8 with reference number 402.

Figure 4:
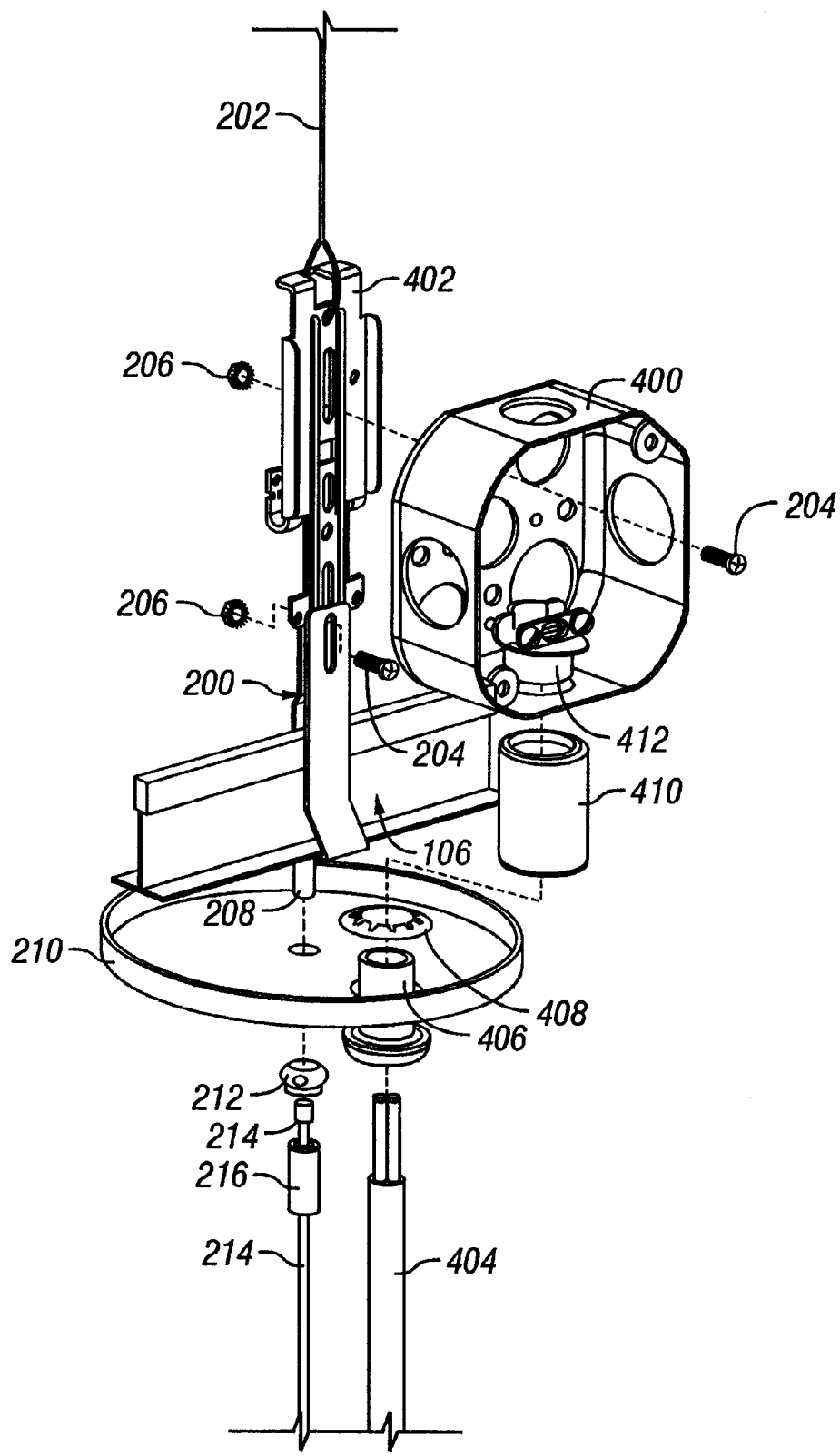
FIG. 4 depicts a tee bar clip and a suspension bracket for mounting a pendant light fixture to a tee bar at a feed location.

Referring to FIG. 4, tee bar clip 200 is shown mounted to tee bar 106 in a similar fashion to that shown in FIGS. 2 and 3. Junction box 400 may be mounted to tee bar clip 200 and suspension bracket 402 using screws 204 and nuts 206 as shown in FIG. 4. SJT cord 404, sliding trim bushing 406, internal teeth retainer 408, pipe coupling 410, and non-metallic cable connector 412 are also shown in FIG. 4.

Figure 5:
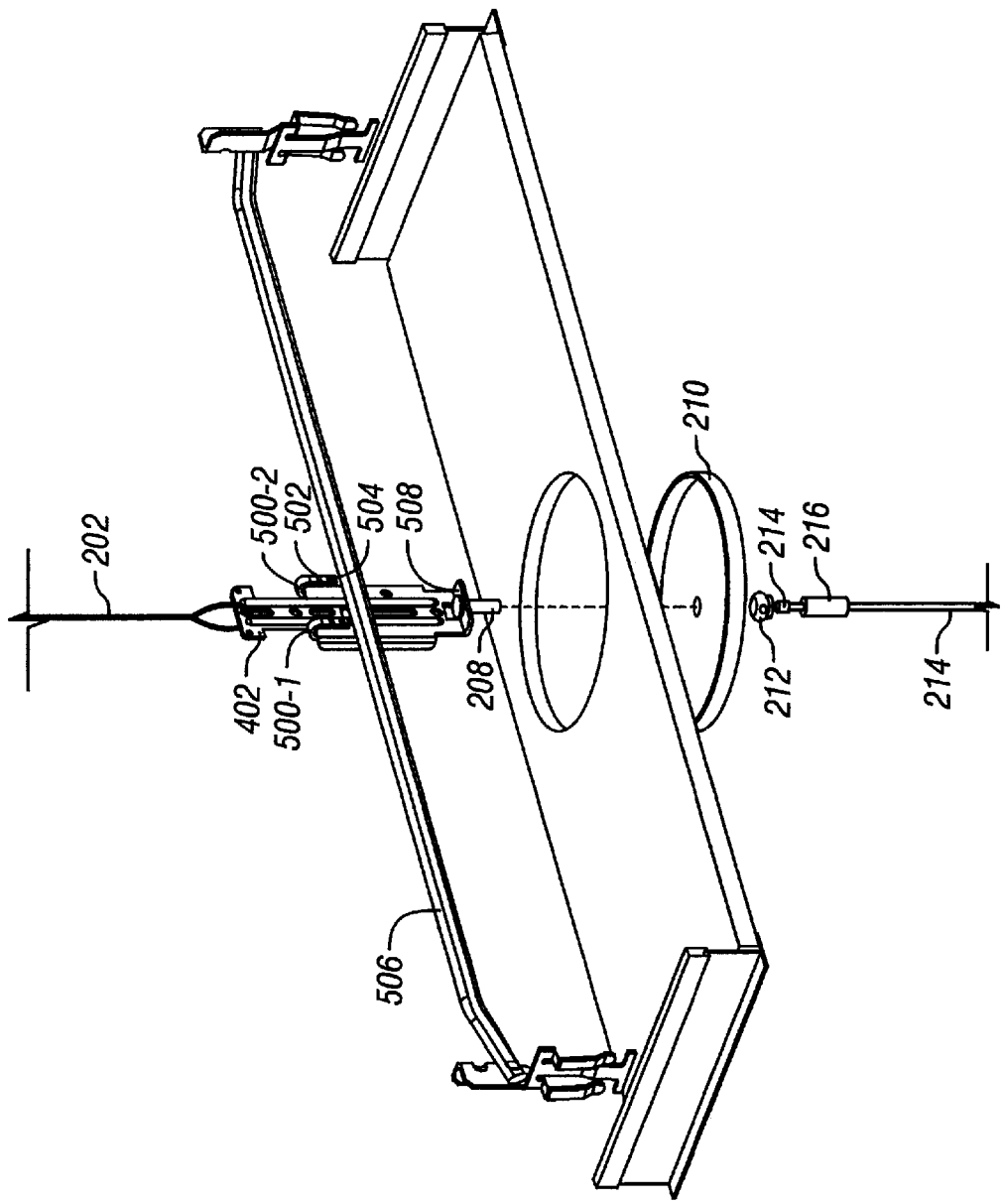
FIG. 5 depicts aspects of a suspension bracket adapted for use in mounting the suspension bracket to a hanger bar.

Referring to FIG. 5, suspension bracket 402 is shown oriented upside-down relative to how suspension bracket 402 is shown in FIG. 4. Suspension bracket 402 includes first and second hook shaped members 500-1 and 500-2. Both hook shaped members preferably include cut out portions, such as cut out portion 502, and a hole, such as hole 504, so that a scratch all hand tool can be inserted into the whole in order to bend the lower portion of hook shaped member 500-2 and the lower portion of hook-shaped member 500-1 around hanger bar 506 after hook-shaped members 500-1 and 500-2 have received hanger bar 506. Suspension bracket 402 includes bolt holding surface 508 for holding bolt 208.

Figure 6:
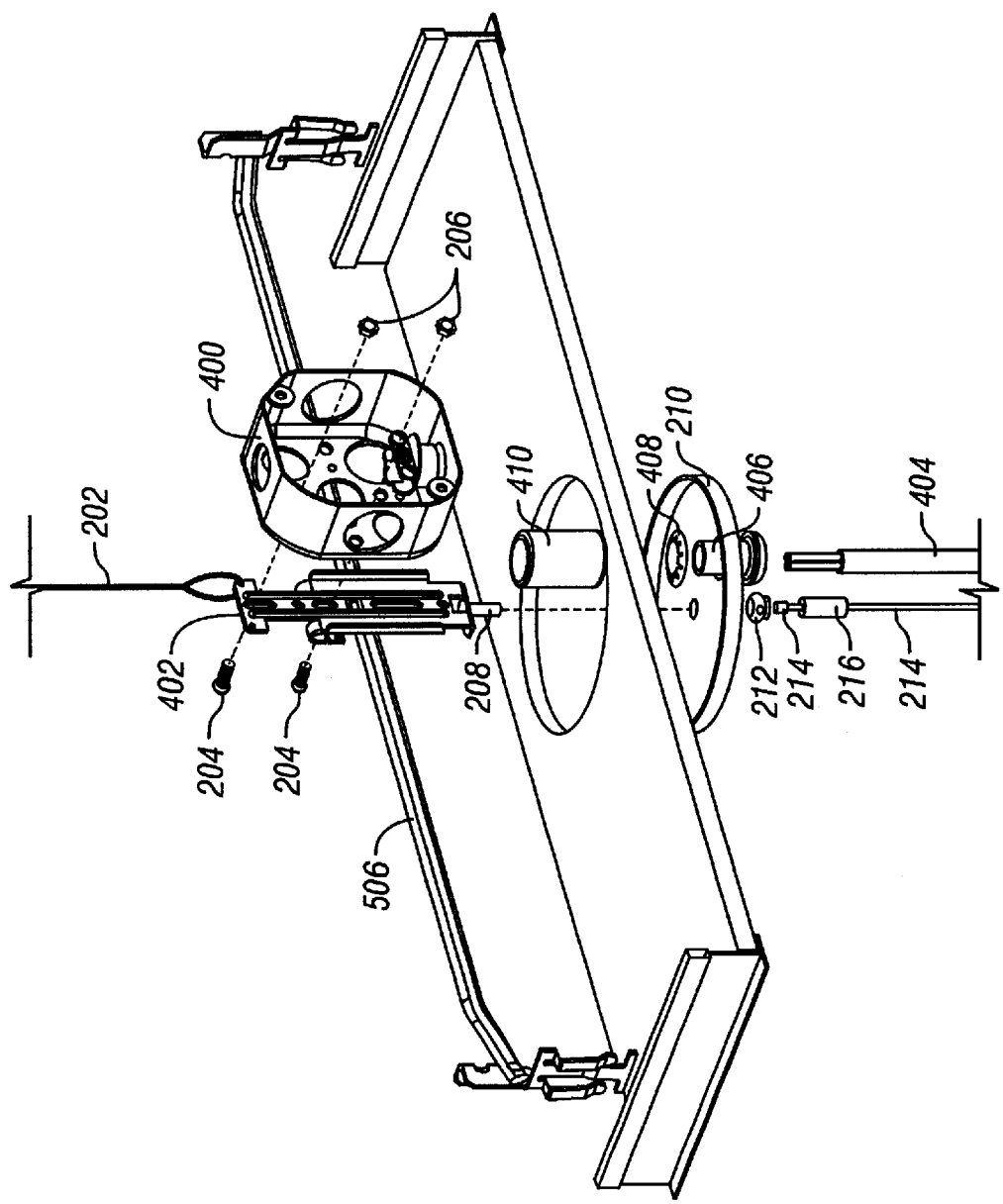
FIG. 6 depicts aspects of a suspension bracket adapted for use in mounting the suspension bracket to a hanger bar at a feed location.

Referring to FIG. 6, suspension bracket 402 may be mounted to hanger bar 506 as previously described in connection with FIG. 5. In addition, junction box 400 may be mounted to suspension bracket 402 as previously described in connection with FIG. 4, except that suspension bracket 402 is oriented upside-down in FIG. 6 relative to the orientation of suspension bracket 402 in FIG. 4.

Figure 7:
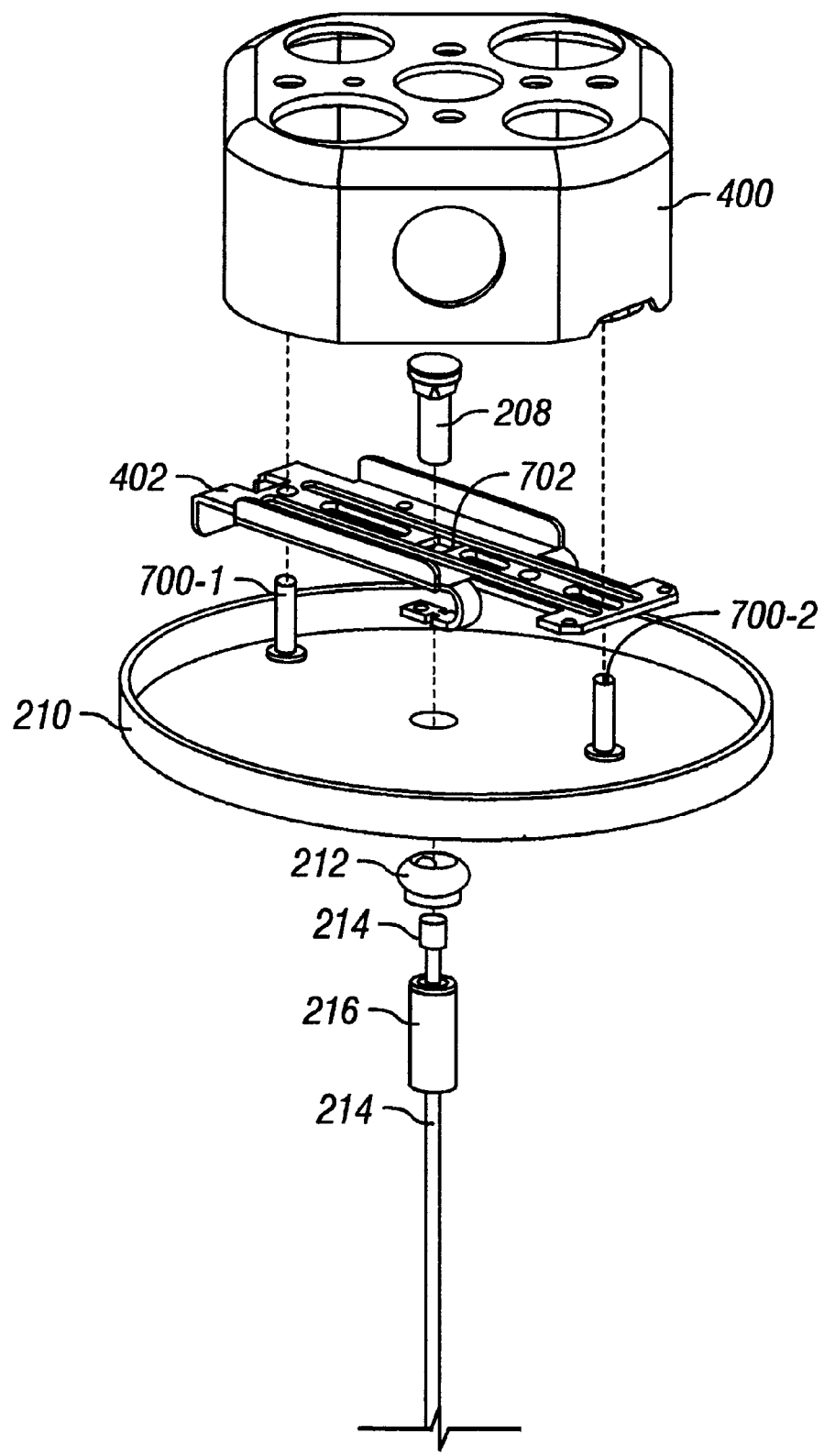
FIG. 7 depicts aspects of a suspension bracket adapted for use in mounting the suspension bracket to an octagon junction box.

Referring to FIG. 7, bolt 208 may be inserted through bolt holding hole 702, and junction box screws 700-1 and 700-2 may be used to fasten suspension bracket 402 to octagon junction box 400. Cable 214 may then be coupled to bolt 208 via cooperation between external threads of bolt 208 and internal threads of coupler 216 as described above in connection with FIG. 2.

Figure 8:
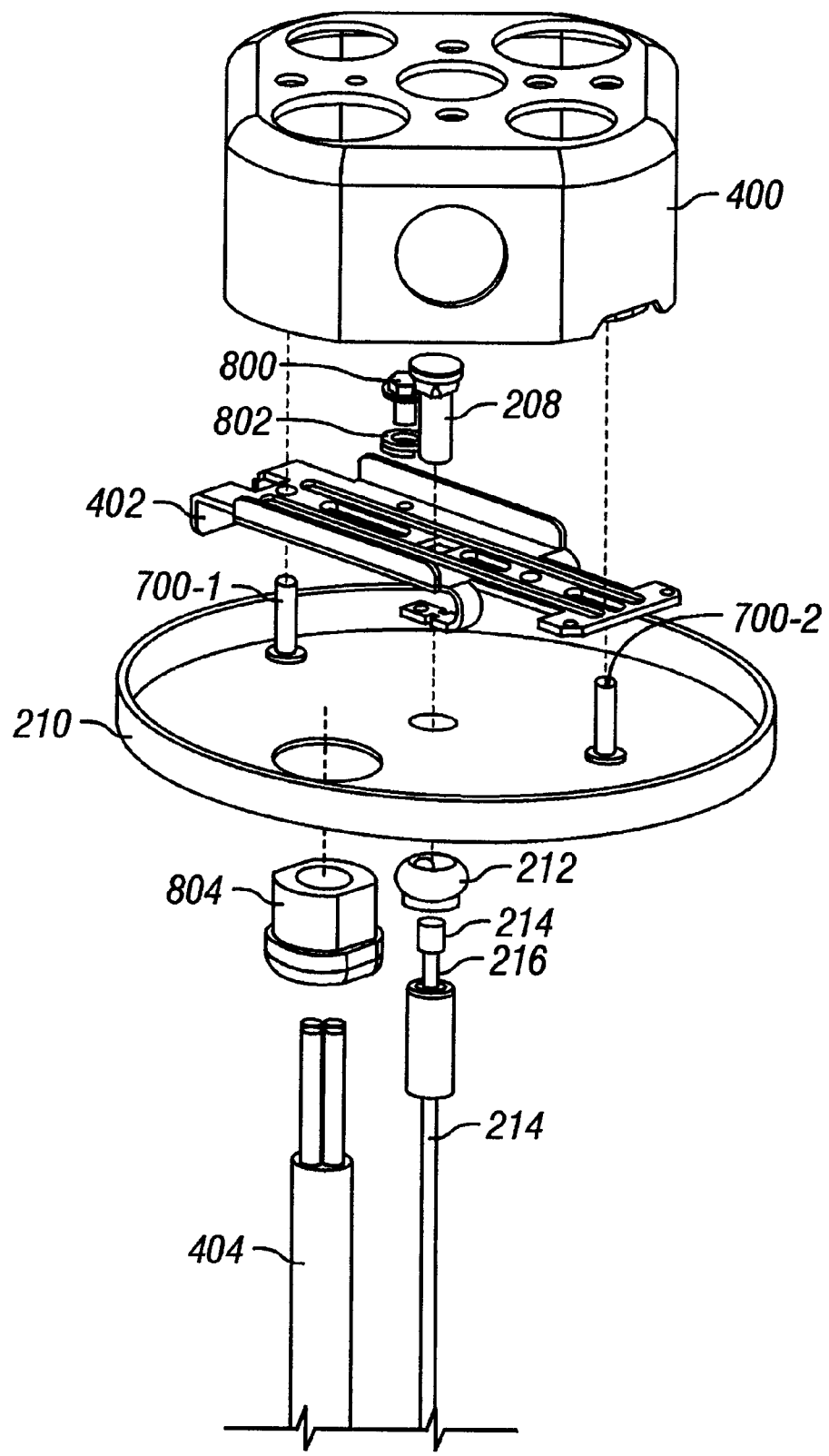
FIG. 8 depicts aspects of a suspension bracket adapted for use in mounting the suspension bracket to an octagon junction box at a feed location.

Referring to FIG. 8, suspension bracket 402 and bolt 208 are coupled to junction box 400 as described above in connection with FIG. 7. In addition, SJT cord 404, strain relief bushing 804, ground screw 800, and washer 802 are also shown.

Various inventive aspects have been described with reference to various preferred embodiments. Various modifications may occur to others upon reading and understanding the foregoing detailed description. The invention includes all such modifications to the extent that they come within the scope of the appended claims or their equivalents.

We claim:

1. A tee bar clip for mounting a pendant light fixture to a tee bar, the tee bar clip comprising:

a first run for engaging a first upper side surface of the tee bar, the first run being substantially planar;

a second run;

a first bend connecting the first run and the second run such that the second run extends away from the vertical axis of the tee bar when the tee bar clip is installed on the tee bar;

a third run for engaging a bottom surface of the tee bar, the third run having a bolt hole through the third run for supporting a bolt;

a second bend connecting the second run and the third run;

a fourth run;

a third bend connecting the third run and the fourth run such that the fourth run extends toward the vertical axis of the tee bar when the tee bar clip is installed on the tee bar;

a fifth run for engaging a second upper side surface of the tee bar clip;

a fourth bend connecting the fourth run and the fifth run such that the fifth run extends substantially parallel to the vertical axis of the tee bar when the tee bar clip is installed on the tee bar;

a sixth run;

a fifth bend connecting the fifth run and the sixth run such that the sixth run extends toward the vertical axis of the tee bar when the tee bar clip is installed on the tee bar;

a seventh run adapted to be fastened to the first run;

a sixth bend connecting the seventh run to the sixth run such that the seventh run extends substantially parallel to the vertical axis the tee bar when the tee bar clip is installed on the tee bar; and the first and seventh runs being adapted to be fastened to one another.

2. The tee bar clip of claim 1 wherein the first run includes a hole through the first run and the seventh run includes a hole through the seventh run.

3. The tee bar clip of claim 2 wherein the hole through the first run and the hole through the seventh run are elongated ovals.

4. The tee bar clip of claim 1 wherein the second bend includes a cutout for facilitating bending of the second bend.

5. The tee bar clip of claim 1 wherein the third run is long enough to accommodate a plurality of tee bar bottom surface sizes.

6. The tee bar clip of claim 1 wherein the fifth run is long enough to accommodate a plurality of tee bar heights.

7. A method of mounting a pendant light fixture to a ceiling tee bar grid span hanger, the method comprising the steps of:

operatively coupling a suspension bracket to the span hanger by receiving the span hanger into at least one securing tab of the suspension bracket, and bending the at least one securing tab of the suspension bracket at least partially around the span hanger.

8. The method of claim 7 wherein the step of bending the at least one securing tab comprises the steps of:

inserting a scratch all into a hole in the at least one securing tab; and using the scratch all to bend the securing tab around the span hanger.

* * * * *